United States Patent
Choi et al.

(10) Patent No.: US 12,006,233 B2
(45) Date of Patent: Jun. 11, 2024

(54) METHODS FOR WATER EXTRACTION

(71) Applicant: Saudi Arabian Oil Company, Dhahran (SA)

(72) Inventors: Seung-Hak Choi, Dhahran (SA); Halah A. Shaikh Sulaiman, Safwa (SA)

(73) Assignee: Saudi Arabian Oil Company, Dhahran (SA)

( * ) Notice: Subject to any disclaimer, the term of this patent is extended or adjusted under 35 U.S.C. 154(b) by 329 days.

(21) Appl. No.: 17/140,390

(22) Filed: Jan. 4, 2021

(65) Prior Publication Data
US 2022/0212956 A1    Jul. 7, 2022

(51) Int. Cl.
| C02F 1/44 | (2023.01) |
| B01D 11/04 | (2006.01) |
| B01D 69/02 | (2006.01) |
| C02F 1/26 | (2023.01) |
| C02F 103/08 | (2006.01) |

(52) U.S. Cl.
CPC .......... *C02F 1/265* (2013.01); *B01D 11/0415* (2013.01); *B01D 11/0488* (2013.01); *B01D 11/0492* (2013.01); *B01D 69/02* (2013.01); *C02F 1/44* (2013.01); *B01D 2325/02* (2013.01); *B01D 2325/38* (2013.01); *C02F 2103/08* (2013.01)

(58) Field of Classification Search
CPC . C02F 1/265; C02F 1/44; B01D 11/00; B01D 11/002; B01D 11/005; B01D 11/04; B01D 11/0415; B01D 11/0492; B01D 37/00; B01D 61/00; B01D 61/002; B01D 61/02; B01D 61/14; B01D 61/08; B01D 2257/80

See application file for complete search history.

(56) References Cited

U.S. PATENT DOCUMENTS

| 3,415,744 A | 12/1968 | Buetow |
| 4,664,808 A | 5/1987 | Kim |
| 4,778,688 A | 10/1988 | Matson |
| 8,088,958 B2 | 1/2012 | Schucker |
| 8,119,007 B2 | 2/2012 | Bajpayee et al. |
| 8,491,792 B2 | 7/2013 | Kipp et al. |
| 9,428,404 B2 | 8/2016 | Bajpayee et al. |
| 2011/0108481 A1 | 5/2011 | Bajpayee et al. |

(Continued)

FOREIGN PATENT DOCUMENTS

| CN | 1751767 | 3/2006 |
| EP | 2977097 | 1/2016 |

(Continued)

OTHER PUBLICATIONS

Albo et al., "Absorption of coal combustion flue gases in ionic liquids using different membrane contactors," Desalination and Water Treatment, 27: 2011, 54-59, 6 pages.

(Continued)

*Primary Examiner* — Allison G Fitzsimmons
(74) *Attorney, Agent, or Firm* — Fish & Richardson P.C.

(57) ABSTRACT

The present application provides a method for extracting an extractable component from a feed liquid using a porous membrane. One embodiment of the method includes temperature-swing solvent extraction of water from saline water using a porous membrane.

18 Claims, 7 Drawing Sheets

(56) References Cited

U.S. PATENT DOCUMENTS

| | | | |
|---|---|---|---|
| 2013/0270187 A1 | 10/2013 | Seibert et al. | |
| 2015/0273396 A1* | 10/2015 | Hancock | B01D 3/145 |
| | | | 210/243 |
| 2018/0297867 A1* | 10/2018 | Fleckner | C02F 1/008 |

FOREIGN PATENT DOCUMENTS

| | | |
|---|---|---|
| IN | 215089 | 2/2008 |
| WO | 2016086102 | 6/2016 |

OTHER PUBLICATIONS

Bajpayee et al., "Very low temperature membrane-free desalination by directional solvent extraction," Energy & Environmental Science, 4: 2011, 1672-1675, 4 pages.

Boo et al., "Membrane-less and Non-Evaporative Desalination of Hypersaline Brines by Temperature Swing Solvent Extraction," Environmental Science & Technology Letters, 6: 2019, 359-364, 6 pages.

Boyle et al., "Applicability Statement for Traffic Engineering with MPLS" RFC 3346, Nework Working Group, Aug. 2002, 14 pages.

Cho et al., "Comparison of hollow fiber memranes in direct contact and air gap memrane distillation," Desalination and Water Treatment, 2015, 9 pages.

Davison et al., "Structure and Amine-Water Solubility in Desalination by Solvent Extraction," Journal of Chemical & Engineering Data, 5: 1960, 420-423, 4 pages.

Demontigny et al., "Comparing the Absorption Performance of Packed cols. and Membrane Contactors," Industrial & Engineering Chemistry Research, 44: 2005, 5726-5732, 7 pages.

Dindore et al., "Hollow fiber membrane contactor as a gas-liquid model contactor," Chemical Engineering Science, 60: 2005, 467-479, 14 pages.

Garcia-Fernandez et al., "Mechanism of formation of hollow fiber membranes for membrane distillation: 1. Inner coagulation power effect on morphological characteristics," Journal of Membrane Science, 542: 2017, 456-468, 13 pages.

Hoff et al., "$CO_2$ absorption with membrane contactors vs. packed absorbers-Challenges and opportunities in post combustion capture and natural gas sweetening," Energy Procedia, 37:, 2013, 952-960, 9 pages.

Huang et al., "Performance comparison between polyvinylidene fluoride and polytetrafluoroethylene hollow fiber membranes for direct contact membrane distillation." Membranes 9.4, 52: 2019, 16 pages.

Lin, "Energy Efficiency of Desalination: Fundamental Insights from Intuitive Interpretation," Environmental Science & Technology, 54: 2020, 76-84, 9 pages.

Luo et al., "Directional solvent for membrane-free water desalination—A molecular level study," Journal of Applied Physics, 110, 2011, 8 pages.

Mosadegh-Sedghi et al., "Wetting phenomenon in membrane contactors—Causes and prevention," Journal of Membrane Science, 452: 2014, 332-353, 22 pages.

Naim et al., "Hydrophobic and hydrophillic hollow fiber membranes for $CO_2$ stripping via gas-liquid membrane contractor," SciVerse Science Direct, Procedia Engineering, 44: 2012, 328-331, 4 pages.

Prince et al., "Nanofiber based triple layer hydro-philic/-phobic membrane—a solution for pore wetting in membrane distillation," Scientific Reports, 4: 2014, 6 pages.

Sanap et al., "Analysis of saline water desalination by directed solvent extraction using octanoic acid, Desalination," 357: 2015, 150-162, 13 pages.

Stephenson et al., "Mutual solubility of water and aliphatic amines," Journal of Chemical & Engineering Data, 38: 1993, 625-629, 5 pages.

Tan et al., "Inorganbic fibre membranes in catalytic processing," Current Opinion in Chemical Engineering, 1: 2011, 69-76, 8 pages.

Vogt et al., "Comparison of membrane contactor and structured packings for $CO_2$ absorption," Energy Procedia, 4: 2011, 1471-1477, 7 pages.

Volkov et al., "Amine-based solvents regeneration in gas-liquid membrane contactor based on asymmetric PVTMS," Petroleum Chemistry, 5: 2015, 716-723, 8 pages.

Zhao et al., "Status and progress of membrane contactors in post-combustion carbon capture: A state-of-the-art review of new developments," Journal of Membrane Science, 511, 2016, 180-206, 28 pages.

PCT International Search Report and Written Opinion in International Appln. No. PCT/US2022/011080, dated Apr. 4, 2022, 14 pages.

Yang et al., "A Review on Reverse Osmosis and Nanofiltration Membranes for Water Purification," Polymers, 2019, 11, 22 pages.

* cited by examiner

METHODS FOR WATER EXTRACTION

TECHNICAL FIELD

The present disclosure is directed to methods for extracting water from aqueous fluids. In one example, the disclosure provides a method for desalinating a saline water, such as an ocean water, by extracting fresh water from the saline water using an organic solvent in which the fresh water is soluble.

BACKGROUND

Water scarcity is one of the leading crises affecting quarter of the world population. Access to fresh drinking water in the geographic areas where the fresh water is scarce allows to maintain productive economic activities in those areas, and to prevent any regional or international armed conflicts over rights to water resources ("water wars").

Desalination technologies exist to produce fresh water from saline water, with more than 10,000 desalination plants operating around the world. The existing desalination technologies can be subdivided into two general categories: evaporative technologies and non-evaporative technologies.

Evaporative technologies include a phase change of the processed water (liquid to vapor, vapor to liquid), where feed saline water is vaporized and then subsequently condensed to produce distilled water. The most common evaporative desalination technologies include multi-stage flash distillation (MSF), multi-effect distillation (MED), and membrane distillation (MD).

In contrast, non-evaporative technologies do not include any phase change of water, and focus on physical separation of water from solutes in the liquid phase. Examples of non-evaporative desalination technologies include membrane-based reverse osmosis (RO), nanofiltration (NF), forward osmosis (FO), electric-field driven electrodialysis (ED), and capacitive deionization (CDI).

While existing desalination technologies provide some access to fresh water, these existing processes suffer from serious drawbacks. Evaporative technologies, for example, require a lot of energy to heat the saline water to produce a steam of fresh water, and then to cool the steam to produce liquid fresh water. Non-evaporative technologies also include very energy-demanding steps. In these non-evaporative processes, the energy is needed, for example, to create sufficient pressure to push the molecules of water through an osmotic membrane or a nanofilter, leaving behind the salt ions. Hence, due to constantly increasing energy costs, the fresh water produced by existing means is too expensive for many. In addition, non-evaporative technologies, such as reverse osmosis, often require complex proprietary membranes that are difficult and expensive to produce, maintain, and replace as they become blocked.

SUMMARY

In a general aspect, the present disclosure provides a method of extracting water from a feed liquid containing water, the method including:
contacting the feed liquid containing water with a solvent liquid using a porous membrane that is configured to create and maintain a contact between the feed liquid and the solvent liquid, for an amount of time sufficient to allow for a dissolution of water into the solvent liquid; and
producing a raffinate containing the feed liquid depleted in water and an extract containing the solvent liquid enriched in water.

In some embodiments, the feed liquid is saline water.

In some embodiments, saline water is selected from ocean water, seawater, salt-lake water, salt marsh water, brackish water, and briny water.

In some embodiments, raffinate includes brine.

In some embodiments, the porous membrane is prepared from a hydrophobic material.

In some embodiments, the method includes preparing the porous membrane from a hydrophobic material.

In some embodiments, the hydrophobic material is selected from polyvinylidene fluoride (PVDF), polyethylene (PE), polypropylene (PP), polytetrafluoroethylene (PTFE), polymethylpentene, poly(vinyltrimethylsilane), hexafluoropropylene, polysulfone (PSU), polyethersulfone (PES), polyphenylene sulfone (PPSU), and poly(vinylidene fluoride-cohexafluoropropylene) (PVDF-HFP), or a mixture or a copolymer thereof.

In some embodiments, porosity of the porous membrane is in a range from about 10% to about 85%.

In some embodiments, mean pore size of the porous membrane is in a range from about 10 nm to about 100 μm.

In some embodiments, the solvent liquid is hydrophobic and immiscible with the feed liquid.

In some embodiments, solubility of water in the solvent liquid is temperature-dependent.

In some embodiments, the solvent liquid includes an alkylamine solvent selected from diisopropylamine (DIPA), N-ethylcyclohexylamine (ECHA), N,N,-dimethylcyclohexylamine (DMCHA), N-methylbutyl amine, diethylmethylamine, and N-ethylpropylamine.

In some embodiments, the solvent liquid includes a fatty acid solvent selected from decanoic acid and octanoic acid.

In some embodiments, the method includes treating the extract to produce water and the solvent liquid depleted in water.

In some embodiments, water is potable water.

In a general aspect, the present disclosure provides a method of extracting a solvent phase from a feed liquid containing a solvent phase and a solute dissolved in the solvent phase, the method including:
contacting the feed liquid with a solvent liquid using a porous membrane that is configured to maintain a contact between the feed liquid and the solvent liquid for an amount of time sufficient to allow for a dissolution of the solvent phase into the solvent liquid; and
producing a raffinate including the feed liquid depleted in the solvent phase and an extract including the solvent liquid enriched in the solvent phase.

In some embodiments:
the feed liquid includes saline water;
the solvent phase includes water; and
the solute includes inorganic salts dissolved in water.

In some embodiments, the method includes treating the extract including the solvent liquid enriched in the solvent phase to produce the solvent phase and the solvent liquid depleted in the solvent phase.

In a general aspect, the present disclosure provides a method of extracting an extractable component from a feed liquid including the extractable component, the method including:
contacting the feed liquid with a solvent liquid at a first temperature using a porous membrane that is configured to maintain a contact between the feed liquid and the solvent liquid for an amount of time sufficient to allow for a dissolution of the extractable component into the solvent liquid at the first temperature; and producing a raffinate containing the feed liquid depleted in the extractable component and an extract including the solvent liquid enriched in the extractable component, wherein solubility of the extractable component in the solvent liquid at the first temperature is greater than solubility of the extractable component in the solvent liquid at a second temperature.

In some embodiments, the method also includes bringing the extract containing the solvent liquid enriched in the extractable component to the second temperature to produce the extractable component and the solvent liquid depleted in the extractable component.

Unless otherwise defined, all technical and scientific terms used herein have the same meaning as commonly understood by one of ordinary skill in the art to which the present disclosure belongs. Methods and materials are described herein for use in the present disclosure; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control. Other features and advantages of the present disclosure will be apparent from the following detailed description and figures, and from the claims.

DETAILED DESCRIPTION

In one general aspect, the present disclosure provides a method for extracting water from a feed liquid into a solvent liquid using a porous membrane to create a contact between the feed liquid and the solvent liquid during the extraction. The present disclosure is based, at least in part, on a realization that the porous membrane allows for precise control of a contact area between the feed liquid and the solvent liquid. Generally, using the porous membrane according to the methods of the present disclosure provides much larger contact area between the feed liquid and the solvent liquid per unit volume compared to the conventional extraction processes where the feed liquid and the solvent liquid are admixed (or contacted) without any membrane. Increasing the contact area between the liquids, in turn, results in accelerated mass transfer between the liquids and an increase in overall efficiency of the extraction process. Furthermore, the use of the porous membrane completely eliminates a time-consuming conventional step of separating the extract phase and the raffinate phase by gravity, which reduces the process time and further contributes to the overall efficiency of the extraction process within the present claims.

Figure 1:
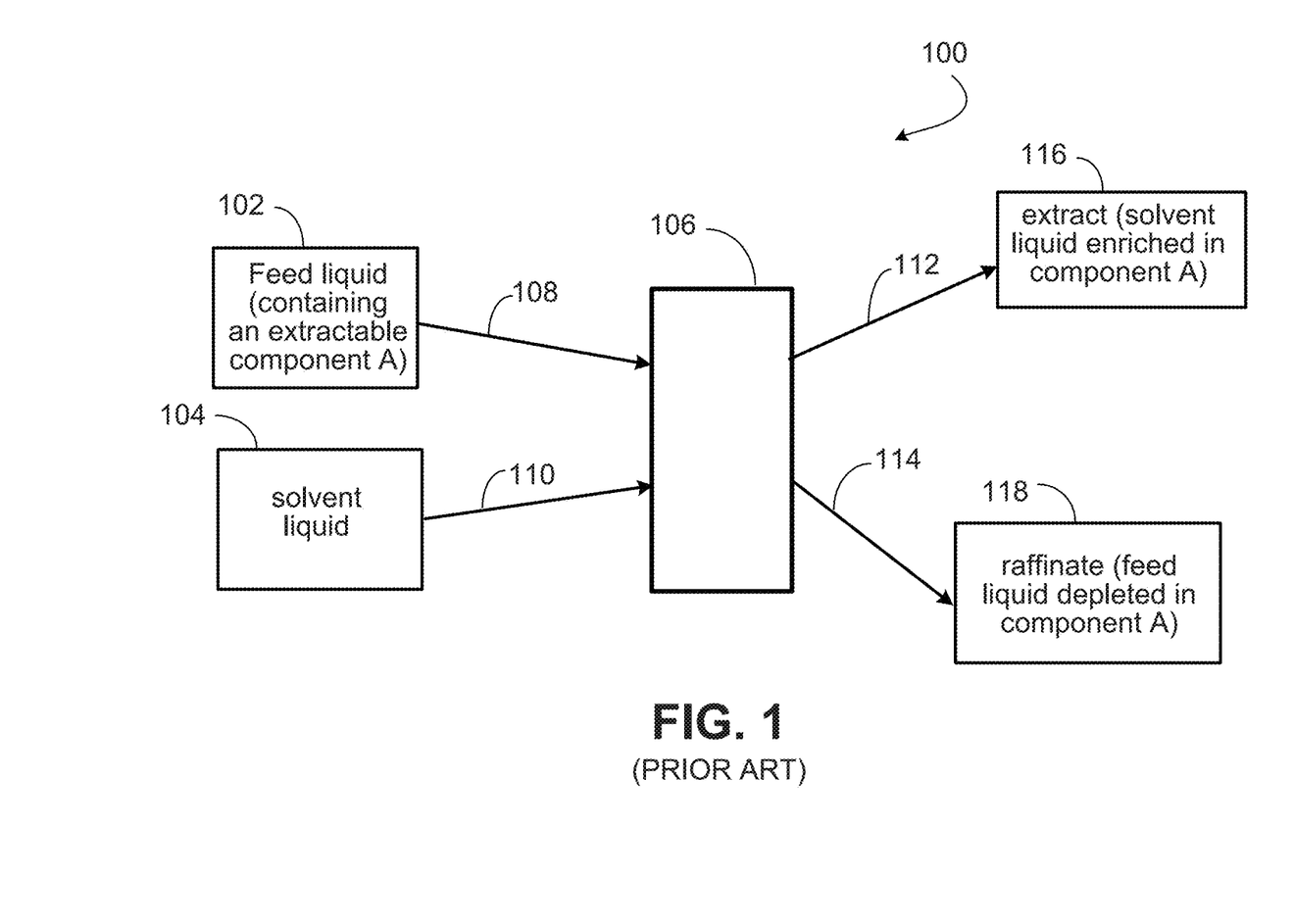
FIG. 1 is a block diagram schematically showing an extraction process 100 for extracting an extractable component A from a feed liquid by a solvent liquid.

FIG. 1 shows a typical extraction process 100. Referring to FIG. 1, a stream 108 of a feed liquid 102 containing an extractable component A is contacted with a stream 110 of a solvent liquid in an extraction system 106. In a laboratory setting, the extraction system 106 can be a separatory funnel shaken by hand. In an industrial setting, the extraction system 106 can be a mixing tank equipped with a mechanical stirrer or an agitator to ensure complete mixing of the feed liquid 102 and the solvent liquid 104 in the extraction system 106.

When the feed liquid and the solvent liquid are physically contacted in the extraction system 106, for example, by vigorously mixing the two liquids, the extractable component A transfers from the feed liquid to the solvent liquid, due to higher solubility of the component A in the solvent liquid as compared to the feed liquid. As a result, a stream 112 is produced of an extract 116 containing the solvent liquid enriched in the component A, and a stream 114 is produced of a raffinate 118 containing the feed liquid depleted in component A. The solvent liquid is "enriched" in component A if the amount of component A in the extract 116 is greater than the amount of component A in the solvent liquid 104. In one example, the solvent liquid 104 is free of component A, while the extract 116 is saturated with the component A (having the maximum possible amount of component A that can dissolve in the solvent liquid at a given temperature). In a similar manner, the feed liquid is "depleted" in component A if the amount of component A in the raffinate 118 is less than the amount of component A in the feed liquid 102. In one example, an amount of component A in the extract 116 is substantially equal to the difference between an amount of component A in the feed liquid 102 and an amount of component A in the raffinate 118.

Referring to the conventional process 100, the feed liquid 102 and the solvent liquid 104 are immiscible. In one example, the feed liquid 102 is hydrophilic and the solvent liquid 104 is hydrophobic. In another example, the feed liquid 102 is hydrophobic and the solvent liquid 104 is hydrophilic. As used herein, two liquids are "immiscible" if they are incapable of being mixed to form a homogenous liquid. For example, a solvent liquid 104 is water-immiscible if the solvent liquid 104 is incapable of being mixed with water to form a homogenous liquid. However, during the extraction process in the extraction system 106, the droplets of the two immiscible liquids 102 and 104 are in physical contact to allow the mass transfer of the extractable component A from the feed liquid 102 to the solvent liquid 104.

Extraction methods of the present disclosure, which generally include using a porous membrane to create a contact between a feed liquid and a solvent liquid, may be described with reference to extraction system 106, feed liquid 102, solvent liquid 104, extract 116, raffinate 118, and extractable component A as described above for the conventional extraction process 100. Certain embodiments of the porous membrane, the extraction system, the solvent liquid, the feed liquid, the extract, the raffinate, the extractable component, as well as various other parameters of the extraction processes of the present disclosure, are described below.

In some embodiments, a feed liquid 102 is a solution which contains a solvent phase and a solute dissolved in the solvent phase. In one example, the extractable component A is the solvent phase of the feed liquid 102. In another example, the extractable component A is the solute dissolved in the solvent phase of the feed liquid 102. In this example, prior to dissolution in the solvent phase of the feed liquid 102, the extractable component may be a solid (e.g., sodium chloride salt) or a liquid (e.g., water or an aqueous solution).

In some embodiments, an extractable component A in the feed liquid 102 is water. That is, the feed liquid 102 is an aqueous liquid. In one example, the aqueous feed liquid 102 is a solution where water is a solute dissolved in an organic solvent phase. Suitable examples of such aqueous feed liquids include moist motor oil containing, e.g., from about 1 wt. % to about 5 wt. % of water, and a moist kerosene containing, e.g., from about 1 wt. % to about 5 wt. % of water.

In some embodiments, the aqueous feed liquid 102 is an aqueous solution, in which the solvent phase contains at least about 50 wt. % of water (e.g., at least about 60 wt. %, at least about 70 wt. %, at least about 80 wt. %, or at least about 90 wt. % of water in the solvent phase of the aqueous solution). In some embodiments, the feed liquid 102 is an aqueous solution in which water is the only solvent. In one example, the solute in the aqueous solution 102 can be at least one organic compound. Suitable examples of such organic compounds include aromatic petrochemicals such as benzene, naphthalene, toluene, and xylene. In some embodiments, the feed liquid 102 is an aqueous solution containing from about 0.1 wt. % to about 1 wt. % of light naphtha. In other embodiments, the feed liquid 102 is an aqueous solution containing a highly polar and water-soluble organic compound. One example of such embodiments is a feed liquid 102 which is an aqueous solution containing from about 1 wt. % to about 5 wt. % of an organic acid, such as benzoic acid, glutaric acid, succinic acid, or malonic acid. Another example of such embodiments is a feed liquid 102 which is an aqueous solution containing from about 5 wt. % to about 20 wt. % of a sugar such as a glucose.

In some embodiments, the feed liquid 102 is an aqueous solution containing at least one inorganic compound dissolved in the aqueous solvent. Suitable examples of such inorganic compounds include an acid, an oxide, a hydroxide, and a salt. In one example of such embodiments, the feed liquid 102 is an aqueous solution containing at least one inorganic salt. Suitable examples of such inorganic salts include sodium chloride, potassium chloride, magnesium chloride, sodium bromide, sodium fluoride, sodium iodide, sodium sulfate, magnesium sulfate, sodium carbonate, potassium carbonate, and calcium phosphate. In some embodiments, the feed liquid 102 is an aqueous solution which is a saline water having salinity from about 0.5 wt. % to about 5 wt. %, such as about 1 wt. %, about 2 wt. %, about 3.5 wt. %, or about 4 wt. %. As used herein, the term "salinity" refers to wt. % of inorganic salts dissolved in water to form the aqueous solution. Typically, from about 50 wt. % to about 99 wt. % of all inorganic salts dissolved in the saline water is sodium chloride (NaCl). In some embodiments, about 85 wt. % of all salts in saline water is sodium chloride, and the remaining 15 wt. % is a combination of potassium chloride, magnesium sulfate, magnesium chloride, and other inorganic salts. In some embodiments, the feed liquid 102 is a saline water selected from ocean water, seawater, salt-lake water, salt marsh water, brackish water, and briny water. In these embodiments, the saline water may also contain proteins, microorganisms, and other organic materials commonly found in naturally occurring salt-water. In some embodiments, a pH of the feed liquid is from about 7 to about 9, or from about 7.5 to about 8.4. In some embodiments, density of the feed liquid is from about 1 g/mL to about 1.3 g/mL, or from about 1 g/mL to about 1.1 g/mL.

Figure 2A:
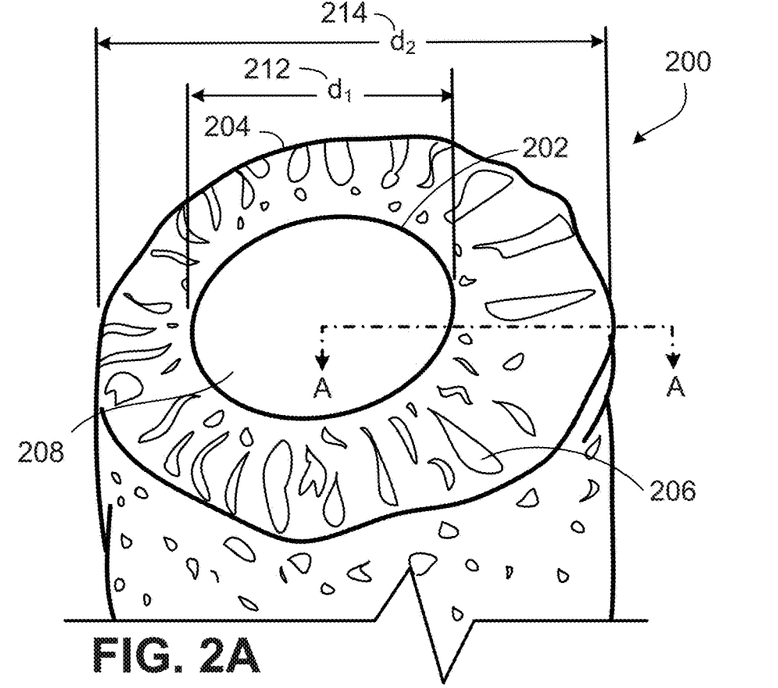
FIG. 2A is an SEM image of a porous hollow fiber membrane.
Figure 2B:
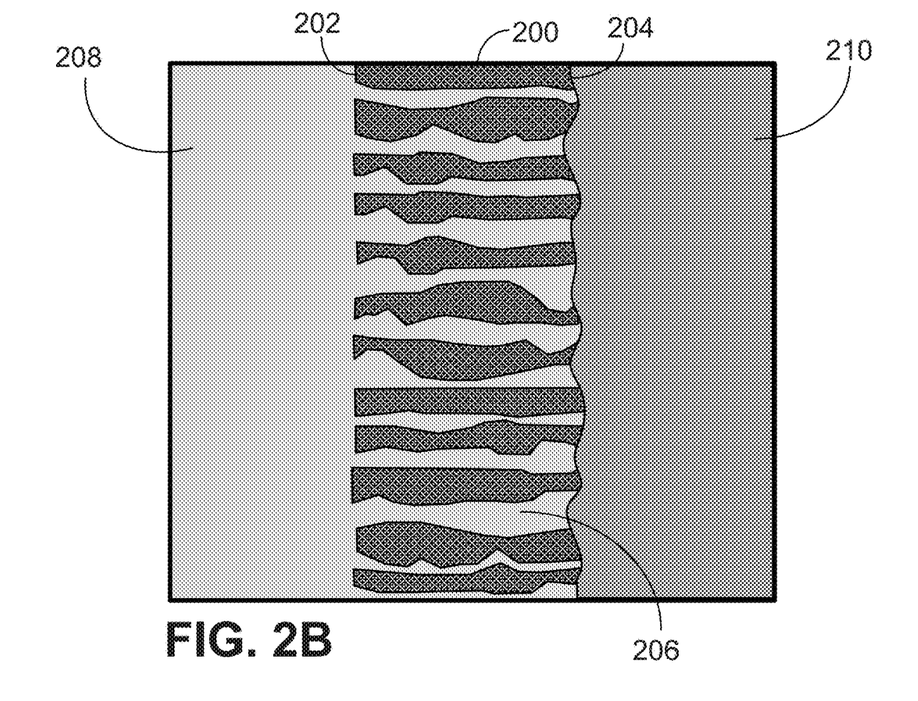
FIG. 2B is a schematic showing of a contact area at the mouth of the pores of a porous membrane between two immiscible liquids.

In some embodiments, the feed liquid 102 and the solvent liquid 104 are contacted in the extraction system 106 using a porous membrane. Such a porous membrane may be configured and/or dimensioned to create and/or maintain a contact between the feed liquid 102 and the solvent liquid 104. The membrane is porous in that it contains open pores, or flow channels, that connect two surfaces of the membrane. An example of a porous membrane that can be used in the extraction system 106 is shown in FIG. 2A. Referring to FIG. 2A, a porous membrane 200 in the form of a hollow fiber contains a lumen side (or a lumen surface) 202 and a shell side (or a shell surface) 204, and a plurality of open pores, such as the pore 206, between the surfaces 202 and 204 of the membrane 200. As shown in FIG. 2B, surface 202 of the membrane 200 may be contacted with a liquid 208, while surface 204 may be contacted with a liquid 210. The liquid 208 may then flow into the pores of the membrane 200, such as the pore 206, to create a contact area at the membrane surface 204 between the liquid 208 and the liquid 210. In one embodiment, the liquid 208 is a feed liquid 102 (referring to FIG. 1), and the liquid 210 is a solvent liquid 104 (referring again to FIG. 1). In another embodiment, the liquid 208 is a solvent liquid 104 (referring to FIG. 1), and the liquid 210 is a feed liquid 102 (referring again to FIG. 1). Physical contact between the solvent liquid 104 and the feed liquid 102 at the membrane surface 204 allows for mass transfer of the extractable component A from the feed liquid 102 to the solvent liquid 104.

In some embodiments, the membrane is prepared from a material to which either the solvent liquid or the feed liquid has an affinity. As used herein, a liquid has "affinity" (or is "affine") to the membrane material when the liquid can provide a high degree of wetting of the surface of the membrane material. That is, the affine liquid can provide a contact angle with the surface between 0° and 90°, such that upon contact with the surface, the liquid can spread over a large area of the surface due to strong solid-liquid interactions. Without being bound by any theory, it is believed that a hydrophilic liquid has a strong affinity to a surface of a hydrophilic membrane material, while a hydrophobic liquid has a strong affinity to a surface of a hydrophobic membrane material. In some embodiments, the liquid having affinity for the membrane material (a feed liquid or a solvent liquid) contains a wetting agent. Examples of such wetting agents include surfactants, such as sodium lauryl sulfate, ethyl cellulose, polysorbate, or polymethylmethacrylate.

In one example of the present disclosure, the membrane material is hydrophobic, the solvent liquid 104 is hydrophobic, and the feed liquid 102 is hydrophilic and immiscible with the solvent liquid 104. In this example, referring to FIG. 2B, liquid 208 is the hydrophobic solvent liquid 104 that flows into the pores of the membrane 200, such as the pore 206, due to its physical affinity to the hydrophobic material of the membrane 200 and its concomitant ability to wet the inner surfaces of the pores. The hydrophilic feed liquid 102, on the other hand, is prevented from wetting the membrane pores due to lack of affinity to the hydrophobic membrane material and weak solid-liquid interactions.

In another example of the present disclosure, the membrane material is hydrophilic, the feed liquid 102 is hydrophilic, and the solvent liquid 104 is hydrophobic and immiscible with the hydrophilic feed liquid 102. In this example, referring to FIG. 2B, liquid 208 is the hydrophilic feed liquid 102 that flows into the pores of the membrane 200, such as the pore 206, due to its physical affinity to the hydrophilic material of the membrane 200 and its concomitant ability to wet the inner surfaces of the pores. The hydrophobic solvent liquid, on the other hand, is prevented from wetting the membrane pores due to lack of affinity to the hydrophilic membrane material and weak solid-liquid interactions.

In yet another example of the present disclosure, the membrane material is hydrophilic, the solvent liquid 104 is hydrophilic, and the feed liquid 102 is hydrophobic and immiscible with the hydrophilic solvent liquid 104. In yet another example, the membrane is hydrophobic, the feed liquid is hydrophobic, and the solvent liquid is hydrophilic and immiscible with the feed liquid.

In some embodiments, the porous membrane is prepared from a hydrophobic material. In some embodiments, the processes of the present disclosure include preparing the porous membrane from a hydrophobic material. Examples of hydrophobic materials include hydrophobic polymers, such as fluoropolymers. In some embodiments, the hydrophobic membrane material contains polyvinylidene fluoride (PVDF), polyethylene (PE), polypropylene (PP), polytetrafluoroethylene (PTFE), polymethylpentene, poly(vinyltrimethylsilane), hexafluoropropylene, polysulfone (PSU), polyethersulfone (PES), or polyphenylene sulfone (PPSU), including mixtures or copolymers thereof, such as poly (vinylidene fluoride-cohexafluoropropylene) (PVDF-HFP). The hydrophobic membrane material may also contain pore former additives, such as polyvinylpyrrolidone (PVP), lithium chloride (LiCl), glycerol, or polyethylene glycol (PEG). In some embodiments, hydrophobicity of the surface of the membrane material may be increased by including coating and nanoparticles, such as $TiO_2$, $SiO_2$, or carbon nanotubes, into the membrane material. In some embodiments, the hydrophobic membrane in the extraction system 106 can be any one the hydrophobic membranes useful for water desalination by membrane distillation (for example, direct contact membrane distillation or air gap membrane distillation).

In some embodiments, the membrane is prepared from a hydrophilic material. Suitable examples of hydrophilic materials include hydrophilic polymers, such as polymers containing numerous hydroxyl groups. In some embodiments, the hydrophilic membrane material includes cellulose, cellulose diacetate, cellulose triacetate, polyethylene glycol (PEG), polyetherimide (PEI), or any mixtures or copolymers thereof. Other suitable examples of hydrophilic membrane materials include inorganic materials, such as ceramics, oxides, glass, carbon, zeolites, or $Al_2O_3$. The hydrophobic membrane material may also contain additives, such as binders, dispersants, pore formers, plasticizers, or any mixture of the foregoing. In some embodiments, the hydrophilic membrane in the extraction system 106 can be any one the hydrophilic membranes useful in membrane contactor applications or catalytic processing.

In some embodiments, a porous membrane has porosity in a range from about 10% to about 85%. As used herein, the term "porosity" refers to a ratio of the combined volume of all pores in a material to the total volume of the material (including the pores). Membrane porosity may be determined, for example, using a gravimetric method. In one example, porosity can be determined by measuring weight change of the material before wetting (dry state) and after wetting (wet state) using a wetting liquid for which the density is already known. Based on the measured weight change, the volume of pores which is filled by wetting liquid can be calculated. In some embodiments, porosity of a membrane of the present disclosure is from about 10% to about 75%, from about 10% to about 65%, or from about 10% to about 50%. In some embodiments, a density of the membrane is from about 0.1 $g/cm^3$ to about 5 $g/cm^3$, for example, from about 0.8 $g/cm^3$ to about 2.3 $g/cm^3$.

In some embodiments, mean pore size of the pores of a porous membrane of the present disclosure is from about 10 nm to about 100 µm, from about 50 to about 500 nm, or from about 100 nm to about 400 nm. In some embodiments, the membrane is mesoporous (having pores with diameters between about 2 nm and about 50 nm) or macroporous (having pores with diameters larger than about 50 nm) according to IUPAC nomenclature.

In some embodiments, liquid entry pressure of the porous membrane of the present disclosure is from about 1 bar to about 20 bar, from about 1 bar to about 4 bar, or from about 1.1 bar to about 3.9 bar. As used here, the term "liquid entry pressure," or "LEP," refers to a minimum pressure that is required for a liquid to penetrate and flow into the largest pore on the membrane surface. In some embodiments, LEP is determined for a liquid that lacks affinity to the membrane material. In one example of such embodiments, LEP may be determined for a hydrophobic membrane and a hydrophilic liquid. In another example of such embodiments, LEP may be determined for a hydrophilic membrane and a hydrophobic liquid. Generally, LEP can be determined using the following equation:

$$\Delta P = \frac{4\sigma \cos\theta}{d_P}$$

In this equation, σ is surface tension of the liquid ($J/m^2$), θ is a contact angle of the liquid on the membrane surface (degree), and $d_P$ is the maximum pore size of the membrane (m).

In some embodiments, a porous membrane in the extraction system 106 may be in a planar form or a tubular form. Example of the planar form include a flat sheet membrane, and the example of tubular form includes a hollow fiber membrane. Flat-sheet membrane can be used in a spiral-wound membrane module, while a hollow fiber membrane can be used in a hollow fiber membrane module. An example of a hollow fiber membrane is shown in FIG. 2A. As seen in FIG. 2A, a hollow fiber membrane has in outside diameter (or shell diameter) d2 (214), and in inside diameter (or lumen diameter) d1 (212). In one example, a ratio of an outside diameter to an inside diameter of the follow fiber membrane can be from about 1.1 to about 2.5, or from about 1.1 to about 1.8. In this example, outside diameter of the hollow fiber may be from about 0.3 mm to about 4 mm, from about 0.3 mm to about 1 mm, or from about 0.3 mm to about 0.5 mm.

The porous membrane of the present disclosure may be prepared by any technique or process known in the industry for making membrane materials. Suitable examples of processes useful in making porous membranes of the present disclosure include phase inversion methods, such as diffusion induced phase separation process (DIPS), non-solvent induced phase separation process (NIPS), or thermally (or temperature) induced phase separation process (TIPS). The porous membranes may be prepared with any desired degree of flexibility, elasticity, toughness, rigidity, and mechanical strength. A membrane material may be judiciously chosen to ensure the porous membrane is stable and at any operational temperature. A skilled chemical engineer would be able to select and optimize the process parameters to obtain a porous membrane with the desired properties, including mechanical properties and operational properties, such as hydrophobicity and hydrophilicity, porosity, pore size, pore size distribution, and LEP.

In some embodiments, using a porous membrane of the present disclosure in the extraction system 106 leads to a mass transfer coefficient for extractable component A that is from about 3 to about 9 times higher when compared to a conventional direct contact system 106. Without being bound by a theory, it is believed that the mass transfer coefficient is much higher in the instant process because the contact area between the feed liquid 102 and the solvent liquid 104 is much greater when compared to direct contact, such as shaking or otherwise vigorously mixing. In addition, by varying the process parameters (such as using membranes with different pore sizes and porosity characteristics), contact area between the feed liquid 102 and the solvent liquid 104 during the extraction process can be precisely controlled, which allows for quick process optimization and compact membrane module assembly. A mass transfer coefficient for the membrane extraction process of the present disclosure can be determined as is customary in the field. A mass transfer coefficient is usually determined using knowledge about membrane structure (membrane material, pore sizes, pore size distribution, porosity), solubility characteristics of the extractable component A in the feed liquid 102 and the solvent liquid 104, as well as the physical properties of the feed liquid 102 and the solvent liquid 104. Furthermore, using a porous membrane of the present disclosure eliminates a conventional step of separation the raffinate 118 from the extract 116 by gravity.

Figure 3:
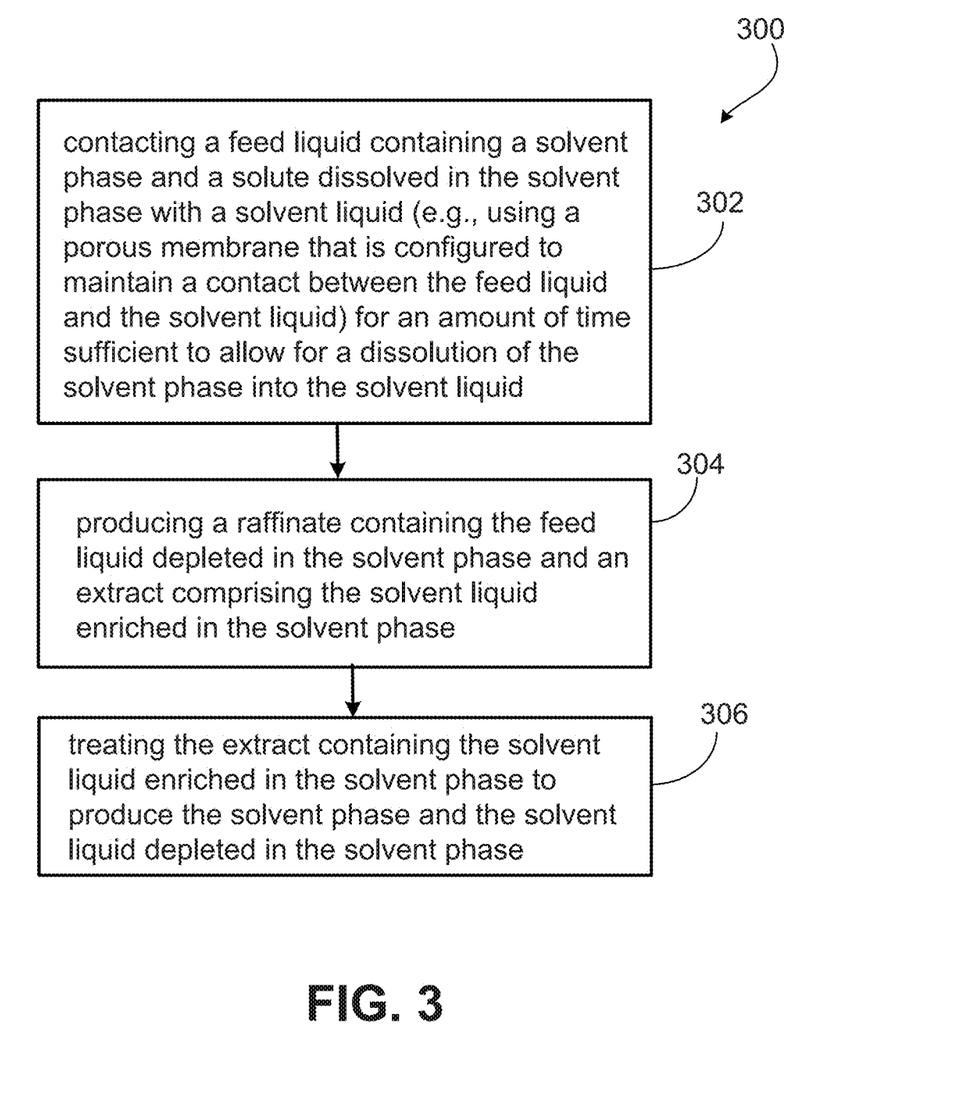
FIG. 3 is a flow chart for an exemplary process 300 for extracting a solvent phase from a feed liquid by a solvent liquid.

In some embodiments, the present disclosure provides a method of extracting a solvent phase from a feed liquid containing a solvent phase and a solute dissolved in the solvent phase. FIG. 3 illustrates such a method 300. Referring to FIG. 3, the method 300 includes a step 302 of contacting the feed liquid with a solvent liquid using a porous membrane that is configured and/or dimensioned to create and/or maintain a contact between the feed liquid and the solvent liquid for an amount of time sufficient to allow for a dissolution (or a mass transfer) of the solvent phase into the solvent liquid. Any one of the porous membranes described in this application can be successfully used in this method. A porous membrane may be selected by a skilled chemical engineer based on hydrophobicity, hydrophilicity, contact angle, density, and other operational characteristics of the feed liquid and the solvent liquid. An amount of time for contacting the feed liquid and the solvent liquid may range from about 1 second to about 1 hour. In some embodiments, the porous membrane is configured to create and/or maintain a contact between the feed liquid and the solvent liquid at or near a surface of the porous membrane, such at the mouth of the open pores along the surface. An example of a membrane surface where the liquids can be contacted is surface 204 in FIG. 2B. In one example, the solvent liquid useful in step 302 is immiscible with the feed liquid, and the solvent phase of the feed liquid is soluble in the solvent liquid. Solubility of the feed liquid's solvent phase in the solvent liquid used in step 302 may be from about 5 g/L to about 500 g/L. In some embodiments, the solute dissolved in the solvent phase of the feed liquid is substantially insoluble in the solvent liquid used in the extraction process in step 302. The method 300 may also include a step 304 of producing a raffinate containing the feed liquid depleted in the solvent phase (enriched in the solute) and an extract containing the solvent liquid enriched in the solvent phase. In one example of step 304, the solvent liquid in the extract may be saturated with the feed liquid's solvent phase, that is, the concentration of the feed liquid's solvent phase in the solvent liquid has reached its maximum at a given temperature. The method 300 may also include a step 306 of treating the extract obtained in step 304 to produce (or separate) the feed liquid's solvent phase and the solvent liquid depleted in the solvent phase. When the boiling point of the feed liquid's solvent phase is greater than the boiling point of the solvent liquid, for example, by about 50° C., about 70° C., or about 100° C., step 306 of the method 300 may include evaporating the solvent liquid, e.g., using a rotovap, leaving in the bottoms the extracted feed liquid's solvent phase. When solubility of the feed liquid's solvent phase in the solvent liquid is temperature-dependent, treating step 306 of the method 300 may also include changing (increasing or decreasing) a temperature of the extract, thereby reducing solubility of the solvent phase in the solvent liquid and inducing separation of the extracted solvent phase and the solvent liquid. The extracted solvent phase and the solvent liquid may be further physically separated by gravity using, for example, a separatory funnel or a similar industrial equipment.

Figure 4:
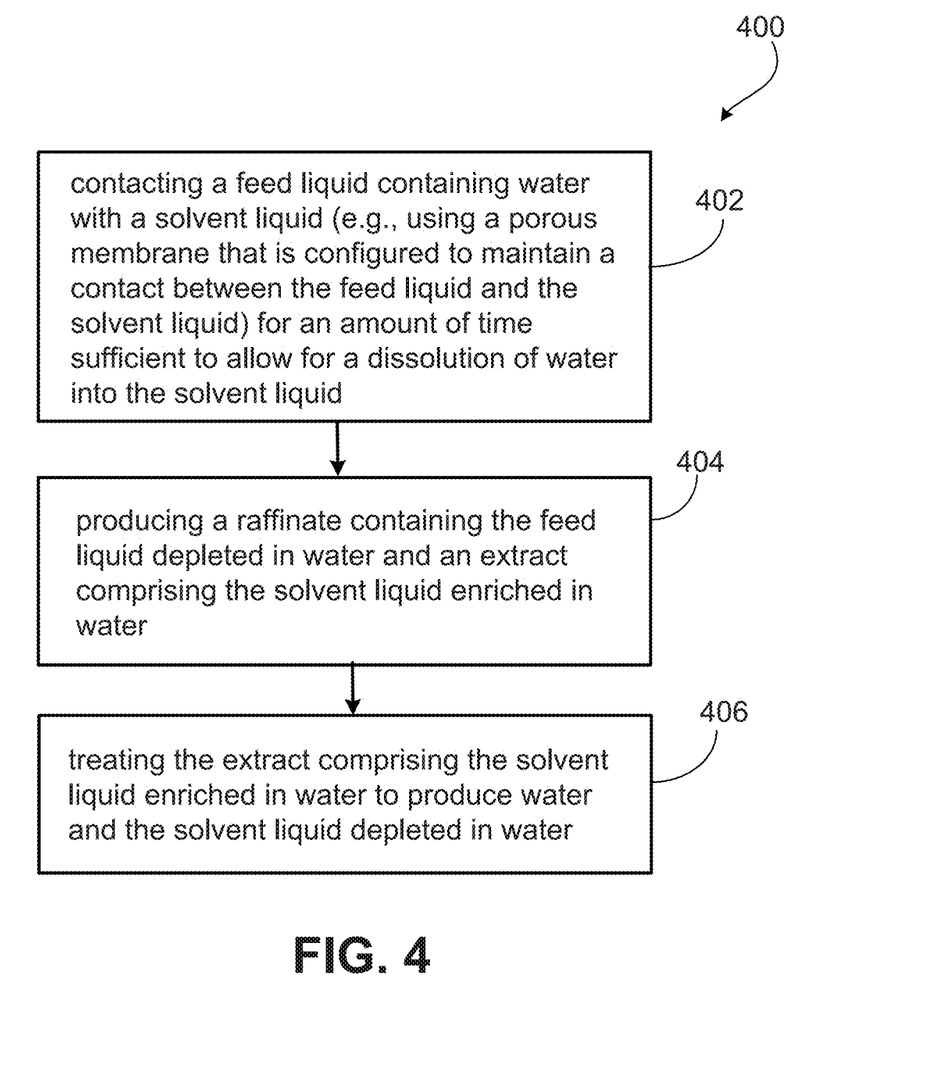
FIG. 4 is a flow chart for an exemplary process 400 for extracting water from an aqueous feed liquid by a solvent liquid.

In some embodiments, the present disclosure provides a method of extracting water form a feed liquid containing water. FIG. 4 illustrates such a method 400. Referring to FIG. 4, the method 400 includes a step 402 of contacting the feed liquid containing water with a solvent liquid using a porous membrane that is configured and/or dimensioned to create and/or maintain a contact between the feed liquid and the solvent liquid for an amount of time sufficient to allow for a dissolution of water into the solvent liquid. In some embodiments of the process 400, the feed liquid containing water in step 402 is any one of the aqueous feed liquids or aqueous solutions described in the present disclosure for the feed liquid 102 (referring to FIG. 1). In some embodiments, the feed liquid containing water in step 402 is a saline water containing water as a solvent phase and inorganic salts dissolved in water as a solute. Examples of such embodiments include seawater, brackish water, or salt-lake water, having salinity from about 1 wt. % to about 4 wt. %. The method 400 may also include a step 404 of producing a raffinate containing the feed liquid depleted in water and an extract containing the solvent liquid enriched in water. When saline water is used as the feed liquid in step 402, the raffinate obtained in step 404 may be a saturated brine, containing from about 10 wt. % to about of 35 wt. % of inorganic salts dissolved in feed liquid, such as NaCl and other inorganic salts. In some embodiments of step 402, the feed liquid containing water is hydrophilic, the porous membrane is hydrophobic, and the solvent liquid is hydrophobic.

A solvent liquid useful in step 402 may be any solvent or a mixture of solvents which is immiscible with an aqueous feed liquid and in which water is soluble. In some embodiments, solubility of water in the solvent liquid useful in step 402 is in a range from about 2 wt. % to about 65 wt. %. That is, a saturated solution of water in the solvent liquid may contain from 2 wt. % to about 65 wt. % of water based on the amount of solvent liquid prior to forming the solution. In some embodiments, a saturated solution of water in the solvent liquid is water-immiscible or otherwise immiscible with an aqueous solution. A solvent liquid useful in step 402 may contain a mixture of a water-miscible organic solvent (that can be mixed with water in any proportion) and a water-immiscible organic solvent (which cannot dissolve any substantial amount of water), such that the solvent liquid is immiscible with an aqueous feed liquid but retains the ability to dissolve water. Examples of water-miscible organic solvents include acetone, methylethylketone, tetrahydrofuran, dioxolane, monoglyme, methylal and acetonitrile. Examples of water-immiscible organic solvents include ethyl acetate, butyl acetate, toluene, and xylene. A solvent liquid useful in step 402 may contain from about 10 wt. % to about 30 wt. % of a water-miscible organic solvent and from about 70 wt. % to about 90 wt. % of a water-immiscible organic solvent. In some embodiments, the solvent liquid useful in step 402 contains a solvent, the saturated solution of water in which is immiscible with water or another aqueous fluid. Examples of such solvents include dioxane, trioxane, trioxepane, tetraoxopane, and any other solvents described in U.S. Pat. No. 3,415,744, which is incorporated herein by reference in its entirety. In addition to such solvent, the solvent liquid may also contain a water-miscible or a water-immiscible organic solvent, or a mixture thereof.

Figure 5:
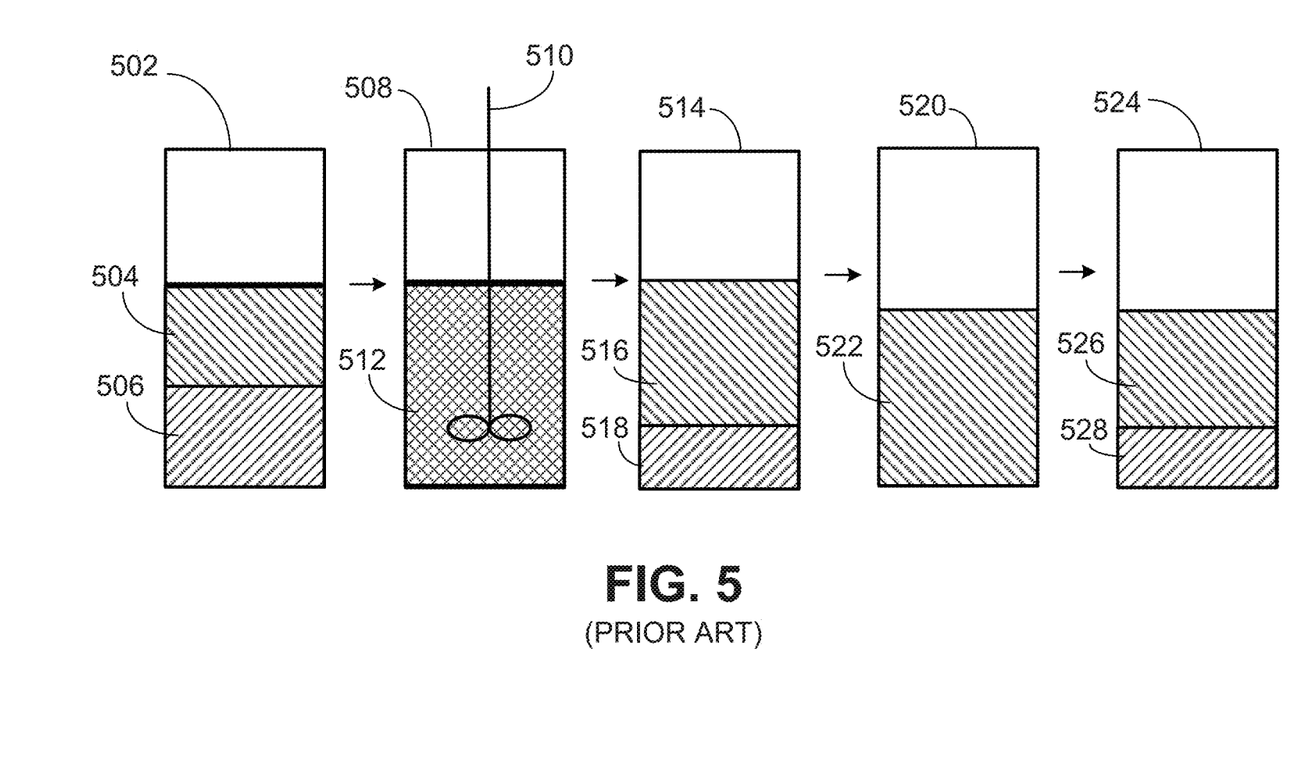
FIG. 5 is a schematic representation of a temperature-swing solvent extraction process.

In some embodiments, solubility of water in a solvent within the solvent liquid useful in step 402 is temperature-dependent. That is, solubility of water in the solvent at one temperature is different from solubility of water in the same solvent at a different temperature. An exemplary process 500 for extracting water from saline feed water using a solvent having temperature-dependent water solubility is shown in FIG. 5. Referring to FIG. 5, in step 502 a hydrophobic solvent 504 is admixed with hydrophilic saline water 506. In this example, hydrophobic solvent 504 has a density less than the density of saline water 506, and because the two liquids are immiscible, the liquid layers are separated by gravity with the layer of solvent 504 above the layer of saline water 506. In the next step 508, the hydrophobic solvent 504 and the saline water 506 are vigorously stirred using a mechanical agitator 510 to produce a homogenous mixture 512. The stirring in 508 is carried out at a first temperature, when solubility of water in the solvent 504 is generally high (greater than solubility of water in solvent 504 at a second temperature). During the stirring in 508, solvent 504 is in direct contact with the saline water 506 within the mixture 512. During the direct contact, the solvent 504 selectively extracts water (a solvent phase) from the saline water 506 while leaving solutes (inorganic salts such as NaCl) in the raffinate. In 514, when the stirring is stopped, the immiscible phases are separated gravitationally to produce a raffinate brine 518 and an extract 516. In step 520, the extract phase 516 can be further physically separated from brine 518 using, for example, a separatory funnel, to obtain the extract 522 that contains solvent 504 that is saturated with water at the first temperature. Further, extract 522 can be treated to a second temperature which is different from the first temperature (second temperature is either higher or lower than the first temperature). Due to decreased solubility of water in solvent 504 at the second temperature, in step 524, the extract 522 yields two immiscible phases, fresh water 528 and solvent 526, which are separated by gravity. In 524, the solvent phase 526 is saturated with water at the second temperature, and the water content in 526 is less than the water content in 516 and 522. Fresh water 528 can be further separated from solvent 526 using, for example, a separatory funnel, for further use. At the same time, solvent 526 can be brought to the first temperature and recycled in step 502 of the process 500 as solvent 504, which may be replenished as necessary. In the process 500, the first temperature and the second temperature are generally in a range from about 20° C. to about 80° C., or from about 20° C. to about 60° C., depending on the hydrophobic solvent 504 used in the process. If the first temperature is greater than the second temperature, extract 522 requires cooling in step 520. If the second temperature is greater than the first temperature, extract 522 requires heating in step 520.

Conventional process 500, however, suffers from serious drawbacks. For example, immiscible phases 516 and 518 at the raffinate separation step 514 may take a long time to separate, thereby decreasing overall efficiency of the extraction process. In some cases, the raffinate separation step takes up a third of the overall process time. Methods of the present disclosure, such as method 400 shown in FIG. 4, significantly enhance performance of the conventional processes such as process 500 by using a porous membrane (for example, a hydrophobic membrane) as a contactor between saline water 506 and hydrophobic solvent 504 in the contacting step 508. Using the porous membrane at the contact step 508 completely eliminates the raffinate separation step, as the extract 522 and raffinate 518 are directly obtained from the contacting step 508, thereby decreasing process time and increasing overall efficiency. Hence, a hydrophobic solvent 504 having temperature-dependent water solubility may be used as a solvent liquid in the method 400 shown in FIG. 4.

Figure 6:
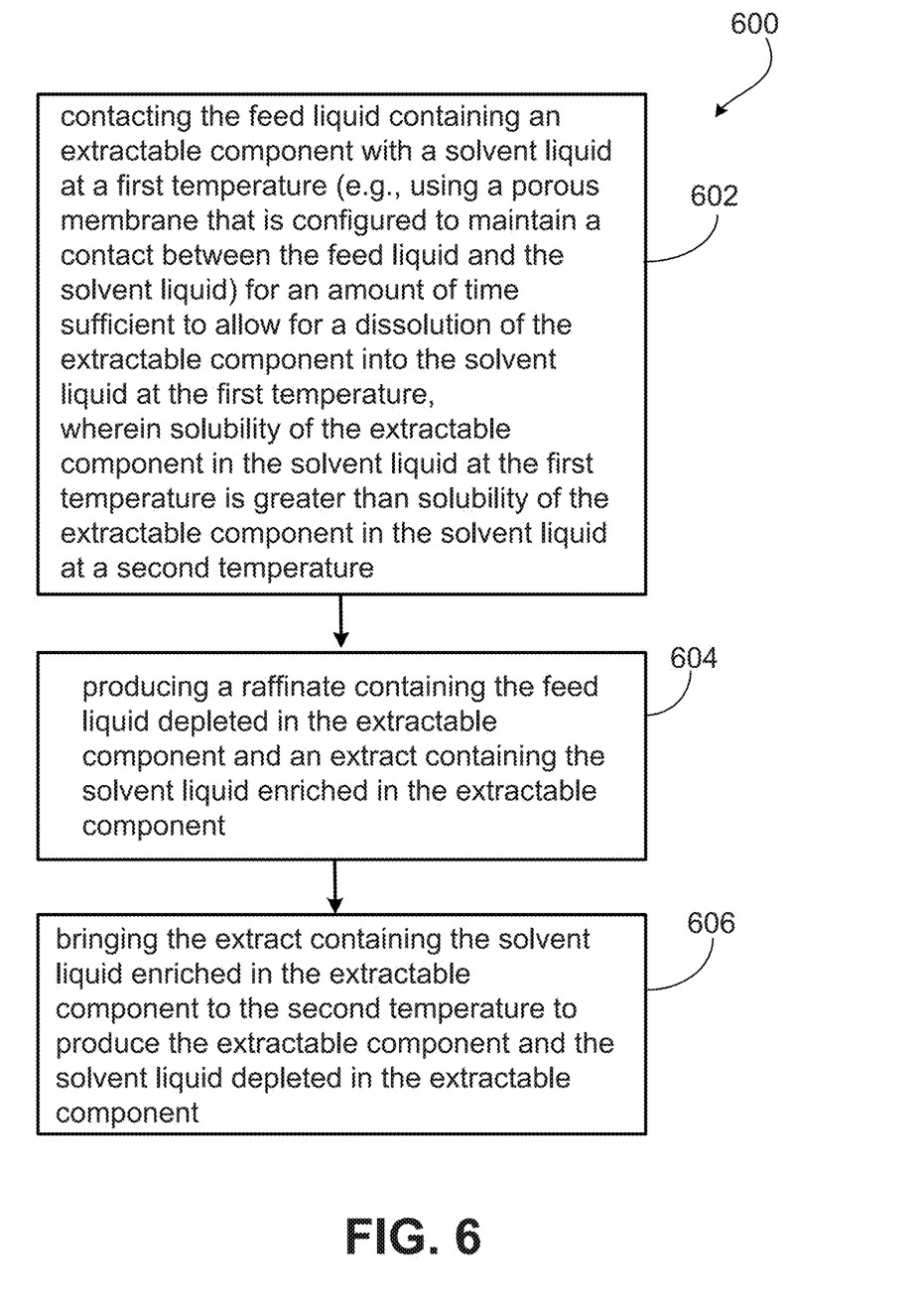
FIG. 6 is a flow chart for an exemplary process 600 for extracting an extractable component from a feed liquid by a solvent liquid using a temperature-swing solvent extraction technique.

In some embodiments, the present disclosure also provides a method for extracting an extractable component from a feed liquid. FIG. 6 illustrates such a method 600. Referring to FIG. 6, the method 600 includes a step 602 of contacting the feed liquid containing an extractable component with a solvent liquid at a first temperature using a porous membrane that is configured and/or dimensioned to create and/or maintain a contact between the feed liquid and the solvent liquid for an amount of time sufficient to allow for a dissolution of the extractable component into the solvent liquid at the first temperature. In some embodiments, solubility of the extractable component in the solvent liquid at the first temperature is greater than solubility of the extractable component in the solvent liquid at a second temperature. In some embodiments, the first temperature is greater than the second temperature. In these embodiments, the first temperature is in a range from about 50° C. to about 90° C., and the second temperature is in a range from about 10° C. to about 40° C. In other embodiments, the second temperature is greater than the first temperature. In these embodiments, the first temperature is in a range from about 30° C. to about 55° C., and the second temperature is in a range from about 60° C. to about 100° C. The porous membrane useful in step 602 is any of the porous membranes described earlier. In some embodiments, the process 600 also includes a step 604 of producing a raffinate containing the feed liquid depleted in the extractable component and an extract containing the solvent liquid enriched in the extractable component. In some embodiments, the process 600 also includes a step 606 for bringing the extract containing the solvent liquid enriched in the extractable component to the second temperature to produce the extractable component and the solvent liquid depleted in the extractable component.

In some embodiments of the process 600, the extractable component is water and the feed liquid is any of the aqueous liquids or aqueous solutions described herein. In some aspects of these embodiments, the feed liquid is saline water and the raffinate produced in step 604 is brine. Saline waters and brines are described herein.

In some embodiments, solvent liquid in step 602 includes a solvent that can dissolve water in a temperature-dependent manner while being immiscible with an aqueous feed liquid (such as saline water). This solvent possesses the ability to dissolve water while leaving in raffinate various water-soluble substances, such as sodium chloride. Suitable examples of such a solvent include compounds having hydrophilic moieties in a mainly hydrophobic chemical structure.

One example of such compounds having hydrophilic moieties in a mainly hydrophobic chemical structure is the alkylamines. These compounds have a hydrophilic nitrogen atom with a lone pair of electrons that can form hydrogen bonds with water molecules, while also having hydrophobic alkyl groups. Alkyl groups adjacent to the nitrogen atom further increase the dipole moment of the alkylamine molecules by the inductive effect, thus increasing affinity of the nitrogen atom for water molecules. Solubility of water in alkylamine solvents may be temperature-dependent. Without being bound by a theory, it is believed that at a higher temperature, free rotation of the alkyl groups of the alkylamines increases. Hence, the nitrogen atom is more sterically hindered, and fewer water molecules can be H-bonded to the N atom, resulting in a decrease in solubility of water in the alkylamine solvent. In contrast, at a lower temperature, free rotation of alkyl groups is slower, allowing for more space for water molecules to H-bond with the N atom. Hence, at a lower temperature, solubility of water in alkylamine solvent is increased. Accordingly, in some embodiments of step 602, when solvent liquid contains an alkylamine solvent, the second temperature is greater than the first temperature (the process 600 requires cooling in extraction step 602 and heating in the separation step 606). Examples of alkylamine solvents include diisopropylamine (DIPA), N-ethylcyclohexylamine (ECHA), N,N,-dimethylcyclohexylamine (DMCHA), N-methylbutyl amine, diethylmethylamine, or N-ethylpropylamine, or any combination thereof.

In some embodiments of step 602, the solvent liquid includes N-methylbutyl amine, the first temperature is from about 40° C. to about 45° C., the second temperature is from about 85° C. to about 95° C., solubility of water in the solvent liquid at the first temperature is from about 60 wt. % to about 65 wt. %, while solubility of water in the solvent liquid at the second temperature is from about 30 wt. % to about 35 wt. %.

In some embodiments of step 602, the solvent liquid includes diethylmethylamine, the first temperature is from about 50° C. to about 55° C., the second temperature is from about 60° C. to about 65° C., solubility of water in the solvent liquid at the first temperature is from about 35 wt. % to about 40 wt. %, while solubility of water in the solvent liquid at the second temperature is from about 20 wt. % to about 30 wt. % (e.g., about 25 wt. %).

In some embodiments of step 602, the solvent liquid includes N-ethylpropylamine, the first temperature is from about 45° C. to about 55° C., the second temperature is from about 75° C. to about 85° C., solubility of water in the solvent liquid at the first temperature is from about 45 wt. % to about 55 wt. %, while solubility of water in the solvent liquid at the second temperature is from about 20 wt. % to about 30 wt. % (e.g., about 25 wt. %).

Another example of compounds having hydrophilic moieties in a mainly hydrophobic chemical structure is the edible oils and medium chain fatty acids. These compounds dissolve water due to the presence of a carboxylic acid group (COOH) at the aliphatic chain end. Highly polar C=O and OH groups in these compounds facilitate formation of hydrogen bonds with water molecules. While the chain ends are hydrophilic, the aliphatic chain itself is hydrophobic; hence, the fatty acid solvent that is saturated with water is immiscible with water or other aqueous solutions and feed liquids. Solubility of water in these fatty acid solvents increases with temperature. Accordingly, in some embodiments of step 602, when solvent liquid contains a fatty acid solvent, the first temperature is greater than the second temperature (the process 600 requires heating in the extraction step 602 and cooling in the separation step 606). Examples of fatty acid solvents include decanoic acid and octanoic acid, or any combination thereof.

In some embodiments of step 602, the solvent liquid includes decanoic acid, the first temperature is from about 75° C. to about 85° C., the second temperature is from about 30° C. to about 40° C., solubility of water in the solvent liquid at the first temperature is from about 5 wt. % to about 6 wt. %, while solubility of water in the solvent liquid at the second temperature is from about 3 wt. % to about 4 wt. % (e.g., about 3.8 wt. %).

In some embodiments of step 602, the solvent liquid includes octanoic acid, the first temperature is from about 55° C. to about 65° C., the second temperature is from about 20° C. to about 30° C., solubility of water in the solvent liquid at the first temperature is from about 5 wt. % to about 5.5 wt. %, while solubility of water in the solvent liquid at the second temperature is from about 2 wt. % to about 3 wt. %.

In some embodiments, solvent liquid in step 602 includes an additional solvent, such as a water-miscible or a water-immiscible solvent, or a mixture thereof. Examples of water-miscible and water-immiscible solvents that could be added to the solvent liquid in 602 are described herein.

Figure 7:
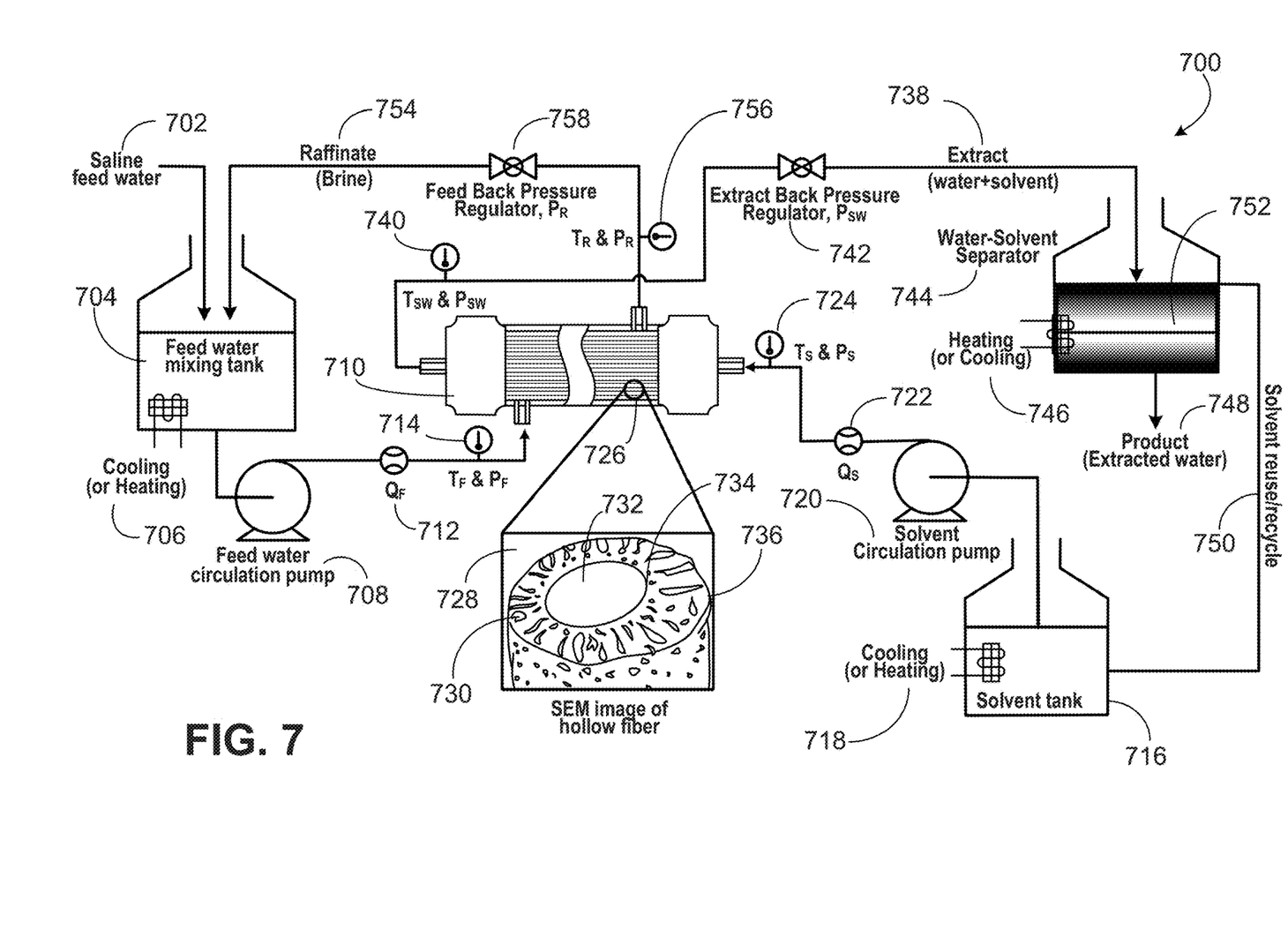
FIG. 7 is a schematic representation of an exemplary membrane-assisted temperature-swing solvent extraction process 700.

An exemplary process 700 for extracting a pure water extractable component from a saline water feed liquid using a solvent liquid containing decanoic acid is illustrated in FIG. 7. In the process 700, saline feed water 702 is added to the feed water mixing tank 704. The mixing tank 704 is equipped with a cooling/heating element 706, which may heat the saline feed water to a first temperature from about 75° C. to about 85° C. To heat the feed water, 706 may contain hot water of steam. The heated saline feed water is then pumped to a membrane module 710 using a feed water circulation pump 708. A rate of saline water flow may be measured using a flowmeter 712. Temperature and pressure of the feed liquid can be measured using a gauge 714. At the same time, solvent liquid containing decanoic acid may be placed in a solvent tank 716 that is equipped with a heating/cooling element 718 which may heat the decanoic acid solvent to a first temperature from about 75° C. to about 85° C. The heated decanoic acid solvent is then pumped to a membrane module 710 using a solvent circulation pump 718. A rate of decanoic acid solvent flow can be measured using a flowmeter 722. Temperature and pressure of the solvent flow may be measured using a gauge 724. The membrane module 710 can contain a hydrophobic porous membrane, such as any of the hydrophobic membranes described herein. An exemplary hydrophobic porous membrane in module 710 is a hollow fiber membrane prepared from polytetrafluoroethylene (PTFE). The membrane may have porosity from about 10% to about 85%, with pore sizes in the range from 10 nm to about 80 µm, such as from 50 nm to about 500 nm. The module 710 may contain a plurality of hollow fiber membranes. Ratio of shell diameter to lumen diameter for each hollow fiber may be from about 1.1 to about 2.5, with the shell diameter for each hollow fiber from about 300 µm to about 4 mm. In one example, ratio of shell diameter to lumen diameter for each of the hollow fiber membranes may be from about 1.1 to about 1.8, with the shell diameter of each hollow fiber from about 300 µm to about 500 µm. Referring to a cross-section 728 of an exemplary hollow fiber membrane 730 taken at a section 726 of the module 710, the decanoic acid solvent flows into a lumen side 732 of the membrane 730. Upon contact with the lumen surface 734, due to its hydrophobic nature, decanoic acid wets the surface 734 of the hydrophobic membrane and flows into the pores and fills the pores of the membrane 730, where it contacts saline feed water at the shell surface 736 of the membrane 730. Because both the decanoic acid solvent and the saline feed water are heated at the first temperature of 80° C., during the contacting, pure water is extracted from the saline water feed liquid into the decanoic acid. The decanoic acid solvent and the saline water feed liquid may be contacted in the module 710 in a countercurrent mode or in a concurrent mode. In one example, the contact between the decanoic acid solvent and the saline water feed liquid is carried out during a counter-current exchange. The liquids may be contacted for an amount of time that is sufficient to obtain an extract 738 that is a saturated solution of water in decanoic acid at the temperature of 80° C., containing about 5.9 wt. %. The sufficient amount of time may range from about 1 second to about 1 hour, and may be precisely controlled, for example, by varying length of the hollow fiber membrane 730 and/or the diameter of the module and/or the flow rates of the feed water and the decanoic acid solvent liquid by controlling feed water circulation pump 708 and/or solvent circulation pump 720. Temperature and pressure of the extract 738 flowing from the membrane module 710 can be determined using a gauge 740. The pressure of the extract 738 can be further regulated using an extract back pressure regulator 742. The extract may be collected in a water-solvent separator 744, which may be equipped with a heating/cooling element 746. Using this element 746, the extract may be brought to a second temperature from about 30° C. to about 35° C. To cool the extract 738 in the separator 744, element 746 may contain a refrigerant, such as a freon. At the second temperature, solubility of water in decanoic acid decreases to about 3.8 wt. %. As a result, pure water 748 precipitates at the bottom of the separator 744. The pure water 748 gravitationally settles at the bottom of the separator 744 because it is immiscible with the water-depleted decanoic acid at the second temperature, and because density of water is greater than density of decanoic acid. A decanoic acid solvent 752 containing only about 3.8 wt. % of water can be recycled in 750 to the solvent tank 716. The solvent tank 716 may be replenished with fresh decanoic acid solvent as needed. At the same time, raffinate brine 754 flowing from the membrane module 710 can be collected or returned to feed water tank 704, where it can be diluted with fresh saline water feed liquid. Temperature and pressure of the raffinate 754 flowing from the membrane module 710 can be determined using a gauge 756. Pressure of the raffinate 754 can be further regulated using a raffinate back pressure regulator 758. During the extraction process in the membrane module 710, saline feed water pressure (determined at 714) remains higher than the solvent pressure (determined at 724) using, for example, back pressure regulators 742 and 758. Furthermore, trans-membrane pressure (a difference between saline feed water pressure and solvent pressure) remains lower that the LEP for the hollow fiber membrane in the module 710. Exemplary LEP of the hollow fiber membrane in module 710 is from about 1 bar to about 20 bar.

In some embodiments, pure water 748 is a potable water. Potable water may contain no more than 0.1 wt. % of salts such as sodium chloride. Generally, potable water is drinking water and is also useful for plumbing, including toilet flushes. In some embodiments, pure water 748 is a drinking water containing no more that about 0.05 wt. % of dissolved inorganic salts. In other embodiments, pure water 748 has salinity as high as 0.2 wt. % and is useful in agriculture, for example, for irrigation. This water is also useful for various industrial purposes, such as washing or cooling, as well as in various manufacturing processes where use of water is necessary.

Selected Definitions

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, that is not otherwise defined, is for the purpose of description only and not of limitation. Any use of section headings is intended to aid reading of the document and is not to be interpreted as limiting; information that is relevant to a section heading may occur within or outside of that particular section.

The term "about" as used in this disclosure can allow for a degree of variability in a value or range, for example, within 10%, within 5%, or within 1% of a stated value or of a stated limit of a range.

The term "substantially" as used in this disclosure refers to a majority of, or mostly, as in at least about 50%, 60%, 70%, 80%, 90%, 95%, 96%, 97%, 98%, 99%, 99.5%, 99.9%, 99.99%, or at least about 99.999% or more.

As used in this disclosure, the term "fluid" refers to liquids, gels, slurries, including slurries with a substantial solids content, and critical and supercritical materials.

Other Embodiments

It is to be understood that while the present disclosure has been described in conjunction with the detailed description thereof, the foregoing description is intended to illustrate and not limit the scope of the present disclosure, which is defined by the scope of the appended claims. Other aspects, advantages, and modifications are within the scope of the following claims.

What is claimed is:

1. A method of extracting water from saline water, the method comprising:
contacting saline water with a solvent liquid using a porous membrane, wherein the saline water comprises a solvent phase and a solute dissolved in the solvent phase, wherein the solvent liquid comprises hydrophilic moieties in a mainly hydrophobic chemical structure, wherein the saline water and the solvent liquid are immiscible, and the solvent phase of the saline water is soluble in the solvent liquid due to the presence of the hydrophilic moieties, wherein the porous membrane is configured to create and maintain a contact between saline water and the solvent liquid, wherein the saline water is contacted with the solvent liquid using the porous membrane for an amount of time sufficient to allow for a dissolution of water into the solvent liquid, wherein the amount of time is in a range of from about 1 second to about 1 hour, wherein the porous membrane comprises a first surface, a second surface, and a plurality of open pores defined between the first surface and the second surface, wherein the saline water is contacted with the first surface, the solvent liquid is contacted with the second surface, and the saline water is contacted with the solvent liquid through the plurality of open pores defined between the first surface and the second surface to create a contact area between the saline water and the solvent liquid at one of the first surface or the second surface of the porous membrane, wherein the saline water is contacted with the solvent liquid using the porous membrane at a first temperature;
producing a raffinate comprising brine and an extract comprising the solvent liquid enriched in water, wherein solubility of water in the solvent liquid is temperature-dependent; and
recovering water from the solvent liquid, wherein recovering water from the solvent liquid consists essentially of bringing the extract to a second temperature different from the first temperature to produce water and the solvent liquid depleted in water as separate, immiscible phases.

2. The method of claim 1, wherein saline water is selected from ocean water, seawater, salt-lake water, salt marsh water, brackish water, and briny water.

3. The method of claim 1, wherein the porous membrane is prepared from a hydrophobic material.

4. The method of claim 1, comprising preparing the porous membrane from a hydrophobic material.

5. The method of claim 4, wherein the hydrophobic material is selected from polyvinylidene fluoride (PVDF), polyethylene (PE), polypropylene (PP), polytetrafluoroethylene (PTFE), polymethylpentene, poly(vinyltrimethylsilane), hexafluoropropylene, polysulfone (PSU), polyethersulfone (PES), polyphenylene sulfone (PPSU), and poly (vinylidene fluoride-cohexafluoropropylene) (PVDF-HFP), or a mixture or a copolymer thereof.

6. The method of claim 1, wherein porosity of the porous membrane is in a range from about 10% to about 85%.

7. The method of claim 1, wherein mean pore size of the porous membrane is in a range from about 10 nm to about 100 μm.

8. The method of claim 1, wherein the solvent liquid comprises an alkylamine solvent selected from diisopropylamine (DIPA), N-ethylcyclohexylamine (ECHA), N,N,-dimethylcyclohexylamine (DMCHA), N-methylbutyl amine, diethylmethylamine, and N-ethylpropylamine.

9. The method of claim 1, wherein the solvent liquid comprises a fatty acid solvent selected from decanoic acid and octanoic acid.

10. The method of claim 1, wherein water produced from the extract is potable water.

11. The method of claim 8, wherein the second temperature is greater than the first temperature.

12. The method of claim 11, wherein the alkylamine solvent is selected as N-methylbutyl amine, the first temperature is in a range of from about 40 degrees Celsius (° C.) to about 45° C., and the second temperature is in a range of from about 85° C. to about 95° C.

13. The method of claim 11, wherein the alkylamine solvent is selected as diethylmethylamine, the first temperature is in a range of from about 50 degrees Celsius (° C.) to about 55° C., and the second temperature is in a range of from about 60° C. to about 65° C.

14. The method of claim 11, wherein the alkylamine solvent is selected as N-ethylpropylamine, the first temperature is in a range of from about 45 degrees Celsius (° C.) to about 55° C., and the second temperature is in a range of from about 75° C. to about 85° C.

15. The method of claim 9, wherein the second temperature is less than the first temperature.

16. The method of claim 15, wherein the fatty acid solvent is selected as decanoic acid, the first temperature is in a range of from about 75 degrees Celsius (° C.) to about 85° C., and the second temperature is in a range of from about 30° C. to about 40° C.

17. The method of claim 15, wherein the fatty acid solvent is selected as octanoic acid, the first temperature is in a range of from about 55 degrees Celsius (° C.) to about 65° C., and the second temperature is in a range of from about 20° C. to about 30° C.

18. The method of claim 1, wherein the porous membrane is a hollow fiber membrane, the first surface is a shell surface of the hollow fiber membrane, the second surface is a lumen surface of the hollow fiber membrane, a ratio of shell diameter to lumen diameter for the hollow fiber membrane is in a range of from about 1.1 to about 2.5, and the shell diameter of the hollow fiber membrane is in a range of from about 300 lam to about 4 mm.

* * * * *

UNITED STATES PATENT AND TRADEMARK OFFICE
CERTIFICATE OF CORRECTION

| | | |
|---|---|---|
| PATENT NO. | : 12,006,233 B2 | Page 1 of 1 |
| APPLICATION NO. | : 17/140390 | |
| DATED | : June 11, 2024 | |
| INVENTOR(S) | : Seung-Hak Choi and Halah A. Shaikh Sulaiman | |

It is certified that error appears in the above-identified patent and that said Letters Patent is hereby corrected as shown below:

In the Claims

In Column 18, Line 56, Claim 18, please replace "300 lam" with -- 300 µm --.

Signed and Sealed this
Third Day of September, 2024

Katherine Kelly Vidal
*Director of the United States Patent and Trademark Office*